(12) United States Patent
Lamorlette

(10) Patent No.: US 6,886,774 B2
(45) Date of Patent: May 3, 2005

(54) METHOD FOR PILOTING A SPINNING PROJECTILE

(75) Inventor: Gérard Lamorlette, Bourges (FR)

(73) Assignee: GIAT Industries, Versailles (FR)

( * ) Notice: Subject to any disclaimer, the term of this patent is extended or adjusted under 35 U.S.C. 154(b) by 0 days.

(21) Appl. No.: 10/703,428

(22) Filed: Nov. 10, 2003

(65) Prior Publication Data

US 2005/0001088 A1 Jan. 6, 2005

(30) Foreign Application Priority Data

Nov. 8, 2002 (FR) .......................................... 02 14073

(51) Int. Cl.[7] ............................................... F41G 7/00
(52) U.S. Cl. ..................................... 244/3.15; 244/3.21
(58) Field of Search ............................... 244/3.15, 194, 244/177, 3.21, 76 R, 3.16, 3.17, 3.2; 701/1, 3, 4

(56) References Cited

U.S. PATENT DOCUMENTS

| 4,034,937 A | * | 7/1977 | Fillery ........................ 244/3.21 |
| 4,234,142 A | | 11/1980 | Yost et al. |
| 4,697,768 A | | 10/1987 | Klein |
| 4,797,829 A | | 1/1989 | Martorella et al. |
| 4,899,956 A | * | 2/1990 | King et al. ................ 244/3.21 |
| 5,170,969 A | * | 12/1992 | Lin ............................ 244/194 |
| 5,259,569 A | * | 11/1993 | Waymeyer et al. ........ 244/3.22 |
| 5,379,968 A | * | 1/1995 | Grosso ...................... 244/3.21 |
| 5,425,514 A | * | 6/1995 | Grosso ...................... 244/3.22 |
| 6,573,486 B1 | * | 6/2003 | Ratkovic et al. ............. 244/3.2 |

FOREIGN PATENT DOCUMENTS

| EP | 0 905 473 | 3/1999 |
| EP | 1 006 335 | 6/2000 |

* cited by examiner

Primary Examiner—Tien Dinh
(74) Attorney, Agent, or Firm—Oliff & Berridge, PLC

(57) ABSTRACT

A method of projectile control provides a control order for an organ allowing the yaw piloting of a spinning projectile. The control order causes a modification of a yaw piloting parameter of the projectile, the parameter that needs to be controlled being fin deflection. The angular rate of roll of the projectile is measured. At least one corrective coupling term is introduced into the evaluation of the control order modifying the yaw piloting parameter. The corrective coupling term is proportional to the angular rate of roll and also to the drift over time of the pitch piloting parameter to provide projectile piloting orders control fin motors.

5 Claims, 7 Drawing Sheets

METHOD FOR PILOTING A SPINNING PROJECTILE

BACKGROUND OF THE INVENTION

1. Field of Invention

The technical scope of the invention is that of methods to formulate a control order for an organ allowing a spinning projectile to be piloted in yaw and pitch, and notably an artillery projectile fired from a cannon.

2. Description of Related Art

Such methods or processes are generally implemented within an autopilot or projectile command control device and they allow the projectile's altitude and trajectory to be controlled in-flight.

In theory, projectiles fired from cannons have a well-known ballistic trajectory. However, external factors (such as wind, temperature and atmospherical pressure) or internal factors (such as initial velocity and the aerodynamic coefficients) are likely to influence the trajectory.

This results in deviations upon the projectile's impacting on the ground which, at the current maximum 155 mm artillery range (around 35 km) are close, for standard deviations, to 500 m in range and 150 m in direction.

So as to improve furing accuracy, certain solutions are known:

Thus, as described by patent FR-2786561, the projectile's range trajectory may be corrected by means of the irreversible deployment of airbrakes, controlled autonomously or from the ground. Standard deviations in accuracy, in this case, at 35 km are of around a hundred meters in range and direction.

As described in patent EP-905473, it is also possible for the trajectory to be controlled continually and autonomously by commanding the rotation (deflection) of aerodynamics fins from an autopilot device on-board the projectile.

Standard deviations in accuracy may be reduced to around ten meters, both in range and direction. Moreover, it is possible to substantially increase the maximum range (which may exceed 65 km without the need for additional propellants or modification to the weapon) by using the gliding effect.

Projectiles that are fully autonomous in flight such as those described in the second family above take their own bearings during their flight by means of a satellite positioning system (more commonly known as a Global Positioning System or GPS). Before being fired, the projectile is programmed with the target's coordinates. It determines its own position during its flight, establishers control orders using appropriate algorithms and implements the trajectory control means that allow it to reach the target defined by the coordinates.

The design constraints (resistance to acceleration) generally lead to these controlled trajectory autonomous projectiles to be given an aerodynamic architecture of the "Canard" type characterized by a rear fixed boattail and by deflectable fins located to the fore of the projectile. Such an architecture is described, for example, by patent EP-905473.

The projectile's flight stability is, in theory, ensured by the aerodynamic configuration and not by gyroscopic effect such as in a conventional shell.

However, non-reproducible aerodynamics imperfections, as well as vortexes generated by the incidence, lead to a random autorotational movement, generally fairly slow (less than 10 rps) about the roll axis. Additionally, classical control algorithms, in which the control orders in yaw and pitch only rely on index values and inertial measurements respectively of yaw and pitch, leading, for the angular roll rates that may be reached, to the selection of control motors for the deflection of the fins whose dynamic characteristics are compatible with the maximum possible rate of roll, for example a motor with a natural frequency of 100 Hz is needed for a rate of roll of 10 rps. Moreover, parasitic angular movements of the projectile, in yaw and pitch, will appear, due to the gyroscopic couplings. These, very badly damped, parasitic angular movements generate obliquities that hinder the correct ballistic behavior of the projectile and result in a reduction of the maximum range of the projectile by a few kilometers.

One solution used on certain missiles, allowing these couplings to be suppressed, consists in piloting the projectile in roll, that is to say, by applying commands allowing the parasitic aerodynamic roll moments to be offset and either the angular rate of roll to be eliminated, or the roll angle to be kept constant. However, it is known that a "Canard" type finned projectile can only be piloted in roll on condition that the rotation of the stabilizing boattail be uncoupled (by being mounted on bearings, for example) so as to eliminate the aerodynamic moments of interaction that are applied to the boattail and which oppose the roll moments created by the differential deflections of the Canard fins. Such a mechanical uncoupling device, for a projectile fired from a cannon, proves particularly fragile and costly. Additionally, the addition of a piloting roll loop results in an increase in the "flight control" function cost.

SUMMARY OF THE INVENTION

The aim of the invention is to propose a control order preparation process for an organ allowing yaw piloting and/or pitch, such process providing better firing accuracy and reliability than for previous processes.

The process according to the invention allows the adoption of a configuration having a fixed rear boattail that is therefore sturdier and more resistant to the firing constraints, whilst reliably ensuring a long range and excellent accuracy.

Moreover, the process according to the invention uses the projectile's flight parameters (spin rate, accelerations) that may be measured by means of a low cost inertial unit without the accuracy being adversely affected.

Thus, the invention relates to a process to prepare at least one control order for an organ allowing the yaw (respectively pitch) piloting of a spinning projectile, process in which the control order causes the modification of one parameter of the yaw (respectively pitch) piloting of the projectile, such parameter being required to be controlled, process in which the control order is evaluated as the sum of a static term, according to the intensities measured and to the yaw parameter index value (respectively pitch) to be controlled, of a dynamic term proportional to the drift through time of the yaw (respectively pitch) parameter to be controlled, and perhaps to an integral term proportional to the integral through time of the deviations between the intensities measured and the index value of the yaw (respectively pitch) parameter to be controlled, this process wherein:

the angular rate of roll (p) of the projectile is also measured, at least one corrective coupling term is introduced into the evaluation of the control order modifying the yaw piloting (respectively pitch) parameter that is proportional to the angular rate of roll and also proportional to the drift over time of the pitch piloting (respectively yaw) parameter.

The process according to the invention thus proposes to prepare the control order for an organ that influences the piloting parameter in question by introducing into the control related to the pitch those terms linked to the yaw and to the rate of roll, and inversely, by introducing into the control related to the yaw those terms linked to the pitch and the rate of roll.

Such a modification allows the yaw/pitch couplings as well as the rate of roll to be taken into account for each control channel. This is carried out to an extent that will be quantified using appropriate coefficients notably linked to the characteristics of the controlled organ, and namely to the geometry of the projectile or to the firing conditions.

Advantageously, the process is also characterized in that when the control order comprises an integral term proportional to the integral according to the time of the deviations between the intensities measured and the index value of the yaw (respectively pitch) parameter to be controlled, a corrective coupling term proportional to the angular velocity of the projectile and to the integral term related to the pitch (respectively yaw) parameter is introduced into the yaw (respectively pitch) parameter.

The proportional integral term allows the organ's control accuracy to be improved, in a manner classical to servo-control techniques.

According to the invention, the integral term of a given control channel (pitch or respectively yaw) is modified so as to cause the intervention of a further pitch/yaw coefficient that is linked to the rate of roll as well as to the integral term of the other channel (yaw or respectively pitch).

So as to facilitate the explanation of the process according to the invention, the sequence to obtain the piloting order will be split and studied as two successive steps.

The first step, according to the invention, consists in preparing deflection angle index values for the fins ($\delta_{LC}$, $\delta_{TC}$) respectively for yaw and pitch.

The control order is thus a deflection angle index value ($\delta_{LC}$, $\delta_{TC}$) for a yaw (respectively pitch) piloting fin where the modification of the deflection angle index value causes the modification of a piloting parameter, namely that of the angular acceleration ($\gamma_L$, $\gamma_T$) of the projectile according to the yaw (respectively pitch) axis at a reference linked to the projectile, the deviations over time of said accelerations being the projectile's spin rate (r, q) about the yaw (respectively pitch) axes, the deflection angles are thus expressed as follows:

Yaw deflection angle index value:

$$\delta_{LC}=H\ S(\gamma_L)+K_C\ \gamma_{LC}-K\ \gamma_L-(\mu r+\upsilon_p pq)$$

Pitch deflection angle index value $$\delta_{TC}=H\ S(\gamma_T)+K_C\ \gamma_{TC}-K\ \gamma_T-(\mu q+\upsilon_p pr)$$

The variables $S(\gamma_L)$ and $S(\gamma_T)$ of the integral terms being obtained via the integration of the following functions:

$$dS(\gamma_L)/dt=\gamma_{LC}-\gamma_L+p\ S(\gamma_T)$$

$$dS(\gamma_T)/dt=\gamma_{TC}-\gamma_T+p\ S(\gamma_L)$$

Expressions in which: H, $K_C$, K, $\mu$ and $\upsilon_p$ are constants that depend on the geometry of the projectile and its flight conditions, $\gamma_{LC}$ and $\gamma_{YC}$ being, in addition, index values of the acceleration to be transmitted to the projectile according to the yaw (respectively pitch) axis, these values being supplied by a guidance rule.

The invention thus enables the deflection index values to be determined for the projectile's canard fins from a guidance rule. This guidance rule is not the subject of the present invention. Using an appropriate algorithm it conventionally supplies the yaw and pitch acceleration index values to be communicated to the projectile to enable it to reach a selected target.

The guidance rule may, for example, be a rule of proportional navigation.

The second step, according to the invention, consists in formulating the electrical control voltage for the back-geared motors driving the yaw and pitch fins.

Thus, the control order established by the process according to the invention is an electrical control voltage ($\mu_L$, $\mu_T$) for a back-geared motor driving a yaw (respectively pitch) piloting fin, any modification of this voltage causing a modification of a piloting parameter that is a deflection angle ($\delta_L$, $\delta_T$) of the fin in question, any drift from the time of said deflection angles being mode ($\delta'_L$, $\delta'_{TC}$), the process is thus also characterized in that a static corrective coupling term that is proportional to the angular rate of roll and also proportional to the pitch (respectively yaw) deflection angle is introduced into the electrical control voltage for a yaw (respectively pitch) piloting fin and in that a corrective coefficient of the static gain that is proportional to the angular rate of roll squared and to the yaw (respectively pitch) deflection angle is also introduced into the static term, the control voltages are thus expressed as follows:

Control voltage of the yaw piloting fin:

$$\mu_L=H\ S(\delta_L)+K_C\delta_{LC}-(K-\lambda p^2)\delta_L+p(K_E+\mu_G)\delta_T-\mu_G\delta'_L+2\lambda p\delta'_T$$

Control voltage of the pitch piloting fin:

$$\mu_T=H\ S(\delta_T)+K_C\delta_{TC}-(K-\lambda p^2)\delta_T-p(K_E+\mu_G)\delta_L-\mu_G\delta'_T-2\lambda p\delta'_L$$

The variables $S(\delta_L)$ and $S(\delta_T)$ of the integral terms being obtained by integrating the following functions:

$$dS(\delta_L)/dT=\delta_{LC}-\delta_L+p\ S(\delta_T)$$

$$dS(\delta_T)/dT=\delta_{TC}-\delta_T+p\ S(\delta_L)$$

Expressions in which: H, $K_C$, K, $\mu_G$, $K_E$ and $\lambda$ are constants that depend on the back-geared motor being used and the inertia controlled.

Since $\delta_{LC}$ and $\delta_{TC}$ are deflection angle index values to be controlled for yaw (respectively pitch), these index values are supplied by index value formulation means.

These voltages are established using yaw and pitch deflection index values.

Such an arrangement aids in the elimination of most of the disturbances due to the roll movement of the projectile as well as the mechanical couplings between yaw and pitch.

For a given piloting it allows the use of back-geared motors of reduced size, power consumption and cost.

Preferably, both steps used in the invention will be united in and by a single autopilot.

Thus, starting with the yaw and pitch acceleration index values given by a rule of guidance it is possible according to the invention to formulate firstly the yaw and pitch deflection index values for the piloting fins.

Thereafter, from said deflection values it is possible to formulate the control voltages of the motors actuating said fins.

BRIEF DESCRIPTION OF THE DRAWINGS

Other advantages of the invention will become more apparent from the following description of the different embodiments, such description made with reference to the appended drawings, in which.

DETAILED DESCRIPTION OF PREFERRED EMBODIMENTS

Figure 1:
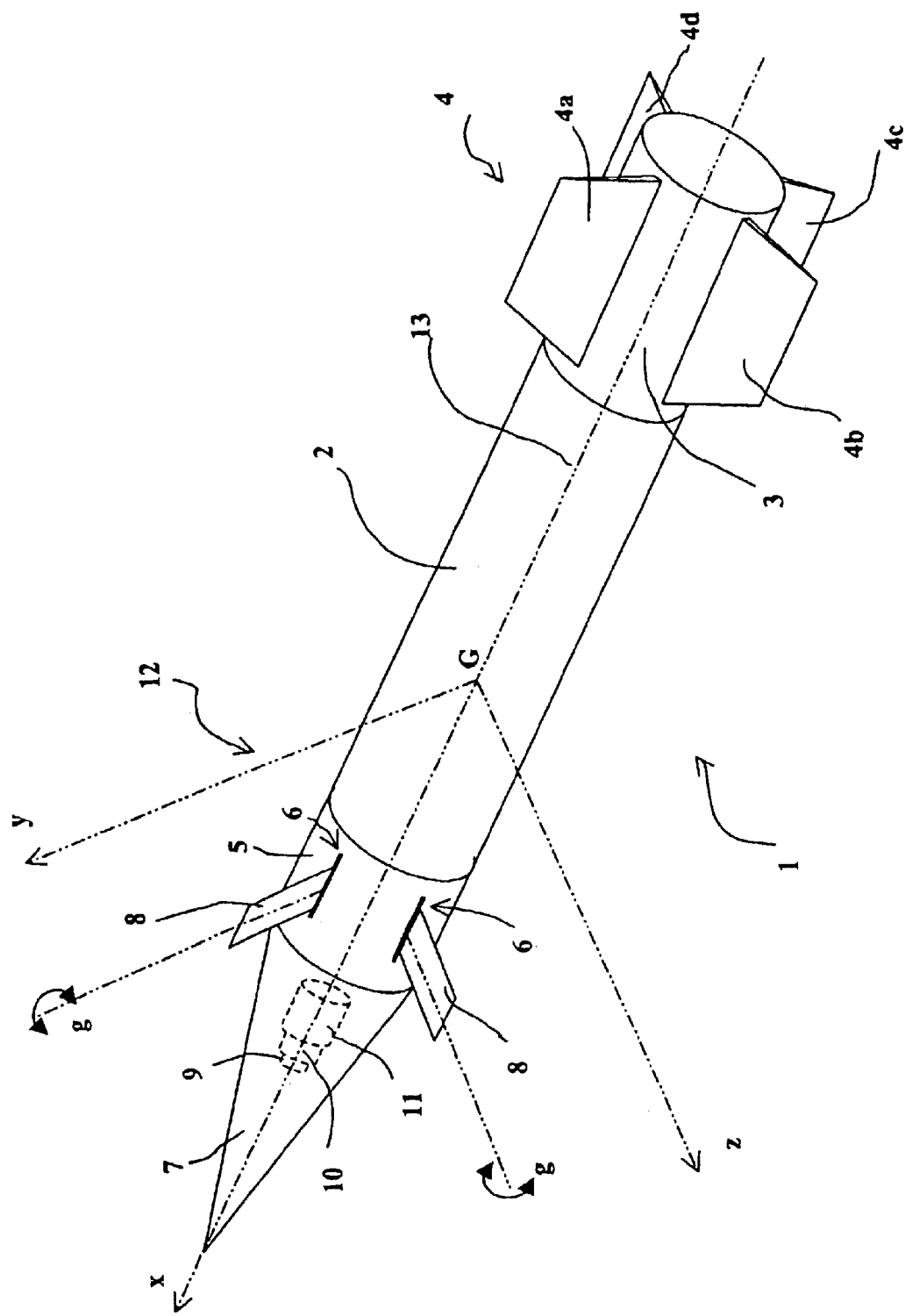
FIG. 1 is an external perspective view of a projectile fitted with an autopilot implementing the process according to the invention.

With reference to FIG. 1, a gliding artillery projection 1 incorporates a body 2 inside which a payload is housed (not shown), for example an explosive charge or load of sub-munitions.

The body 2 ends with a rear portion 3 that may enclose a booster or else a pyrotechnic generator intended to reduce the drag from the base (such generators being commonly known as "base bleed").

The rear portion 3 has a cross-shaped boattail formed of four fixed fins 4a, 4b, 4c, 4d. These fins will be made, for example, in the form of steel sheeting rolled around the projectile body and deploying when the projectile exits the gun barrel by dint of their own elasticity (see namely patent DE 40 25 515).

At its front part, the body 2 has a piloting device 5 that comprises four cross-shaped canard fins 8 that are deployed through slits 6 made in the projectile body. Here, only two of these fins may be seen. The fins are associated in pairs, each pair materializing a piloting plane (pitch or yaw).

The fins 8 are made to spin by back-geared motors (not shown). Each fin revolves about an axis G substantially parallel to the leading edge of the fin and in a radial direction to the projectile.

The projectile is finished off at its front part by a nose cone 7 that encloses an electronic computer 11 for the guidance and piloting. The nose cone also encloses an inertial unit 10 and a satellite positioning system (GPS).

The projectile 1 is fired from an artillery cannon. Means not shown enable it to be fired at a reduced spin rate (use of a sliding band, for example) and other means ensure that the rear boattail 4 and the front fins 8 are held in position and then released. Reference may be made to patent EP-905473 for a fuller description of these means, which are not the subject of the present invention.

An orthonormed geometric reference mark 12 linked to the projectile is shown in FIG. 1 with three orthogonal axes. This mark comprises a first orthogonal axis Gx merged with the axis 13 of the projectile, a second orthogonal axis Gy that is the pitch axis and a third orthogonal axis Gz that is the yaw axis. During its trajectory, the projectile is subjected to velocities and accelerations along the three orthogonal axes thus defined. An action on the fins 8 enables the accelerations to which the projectile is subjected to be modified and thus its trajectory to be corrected.

Figure 2:
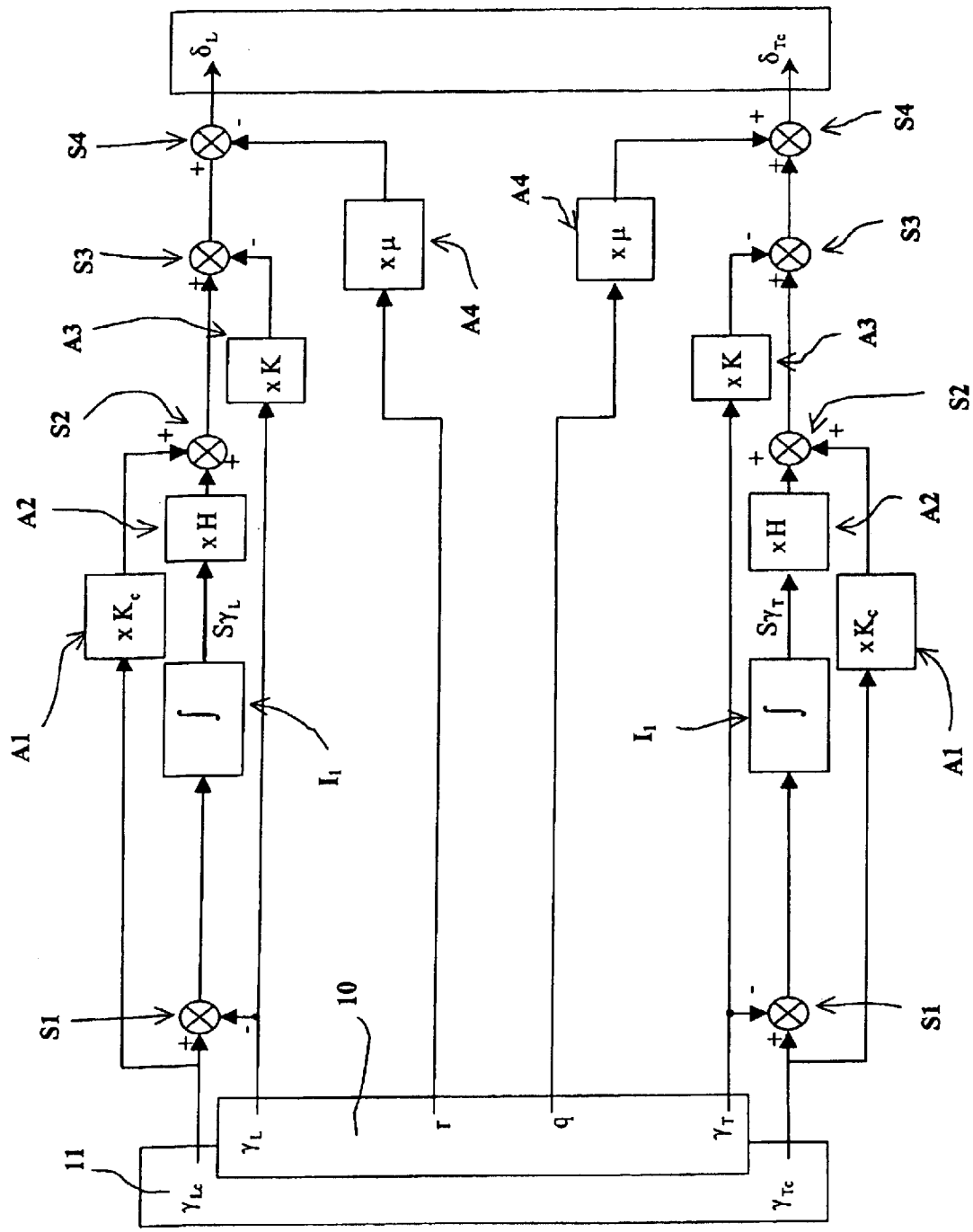
FIG. 2 is a block diagram schematizing the functioning of a process to formulate deflection values according to prior art.

A known piloting process for such a projectile is schematized in FIG. 2.

The electronic computer 11 establishes the desired acceleration values $\gamma_{LC}$ and $\gamma_{TC}$ according to the yaw ($\gamma_{LC}$) and pitch ($\gamma_{TC}$) directions. This is classically performed by using a guidance rule, for example the rule of proportional navigation, from data related to the location of the target, the location of the projectile and the velocity and acceleration of the projectile.

These acceleration values must be transformed in the computer 11 into yaw and pitch deflection angle values for the fins 8 (yaw deflection values: $\delta_{LC}$; pitch deflection value: $\delta_{TC}$).

The classical piloting rule uses yaw ($\gamma_L$) and pitch ($\gamma_T$) acceleration measures performed in continuum by the inertial unit 10. It also uses the measures made by this same inertial unit of the spin rate of the projectile 1 with respect to the yaw axis (rate referenced r) and with reference to the pitch axis (rate referenced q).

The yaw deflection angle to be controlled is thus expressed in the form of the sum:

$$\delta_{LC} = H\, S(\gamma_L) + (K_C \gamma_{LC} - K\gamma_L) - \mu r$$

With $S(\gamma_L)$ which is the solution of the integral equation:

$$dS(\gamma_L)/dt = \gamma_{LC} - \gamma_L$$

The expression of $\delta_{LC}$ for yaw is composed of:

- a static term ($K_C\gamma_{LC} - K\gamma_L$) that depends on the deviation between the index acceleration value and the acceleration value actually measured. Constants $K_C$ and $K$ are constant correction gains. K is the static gain and $K_C - K$ is the phase lead required for the correction.
- a dynamic term ($-\mu r$) that enables the stability of the servo loop to be improved. $\mu$ is the dynamic gain that also depends on the projectile's geometry and its flight conditions; r is the projectile's spin rate with respect to the yaw axis.
- an integral term $H\, S(\gamma_L) = H\int(\gamma_{LC} - \gamma_L)\, dt$ that enables the accuracy of the order to be improved. H is the integral gain of the servomechanism.

All the coefficients ($K_C$, K, $\mu$, H) depend on the projectile's geometry and its flight conditions.

It is possible for the integral term to be omitted but generally speaking it is preferable to retain it in order to improve the order's accuracy.

The pitch deflection angle to be controlled is expressed in an analogous form according to the sum:

$$\delta_{TC} = H\, S(\gamma_T) + (K_C\, \gamma_{TC} - K\, \gamma_T) - \mu q$$

With $S(\gamma_T)$ which is the solution of the integral equation:

$$dS(\gamma_T)/dt = \gamma_{TC} - \gamma_T$$

And q is the projectile's spin rate with respect to the pitch axis.

The block diagram in FIG. 2 shows the practical formulation of the deflection index value $\delta_{LC}$ and $\delta_{TC}$ from the acceleration index values ($\gamma_L$ and $\gamma_T$) and the rate of yaw r and rate of pitch q measurements.

There are two parallel and totally independent computation channels: one for the computation of the pitch deflection index values, and the other for that of the yaw deflection index values.

The computation uses an integrator module 11 for each channel and four amplifier modules A1, A2, A3 and A4 for each channel. These modules are adjusted to the different gains required ($K_C$, K, $\mu$, H). The computation lastly implements four adder modules S1, S2, S3 and S4 for each channel.

The modules shown here in the form of "function blocks" for the sake of the clarity of this document are naturally in practice carried out in the form of programming instructions memorized and performed by a microprocessor included in the computer 11.

Such a piloting process does not give sufficient accuracy for a spinning projectile.

Figure 3:
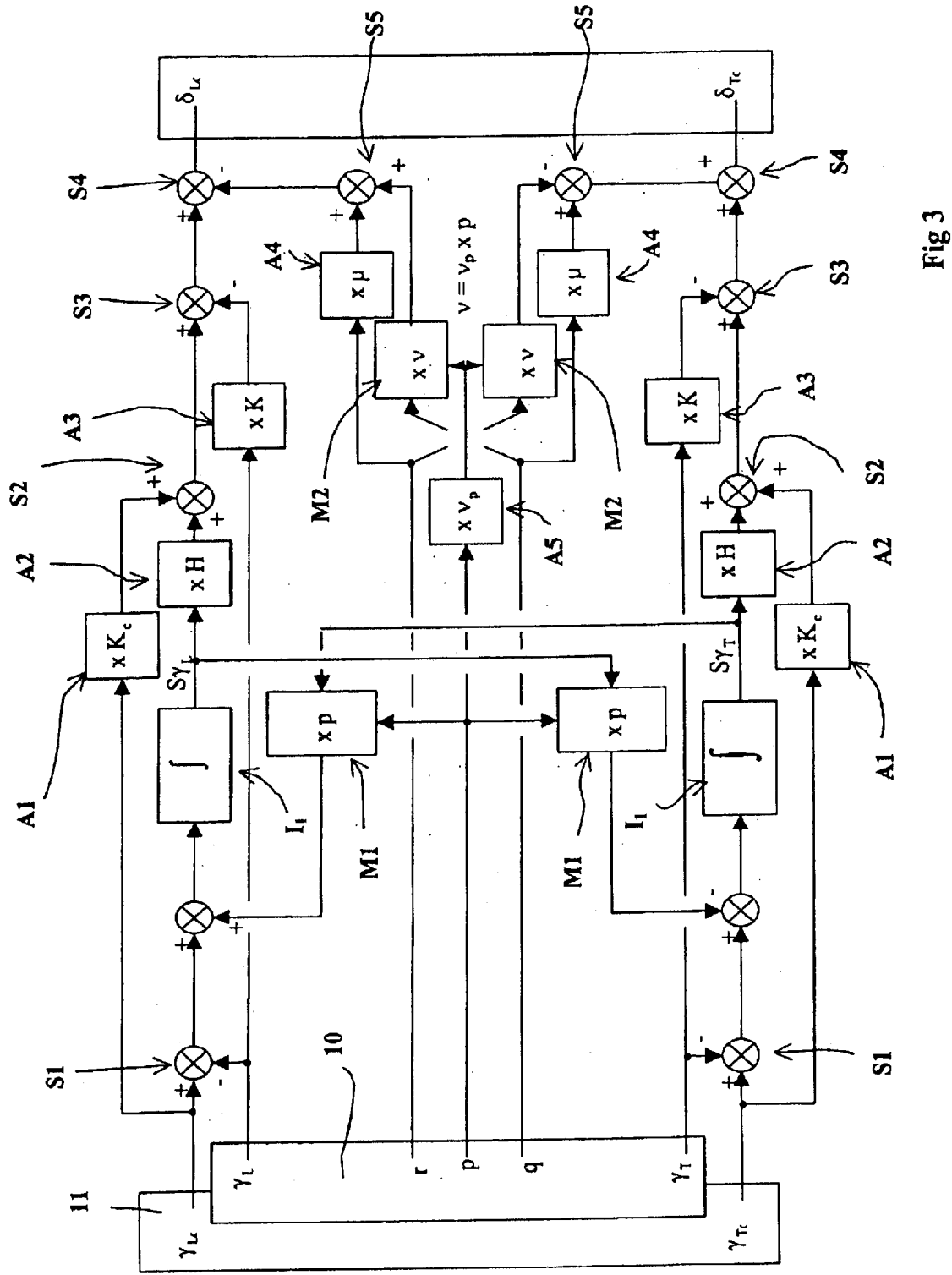
FIG. 3 is a block diagram schematizing the functioning of a process to formulate deflection values according to the invention.

FIG. 3 shows a block diagram schematizing one embodiment of the piloting process according to the invention.

Once again, the electronic computer 11 establishes the required acceleration index values $\gamma_{LC}$ and $\gamma_{TC}$ according to the yaw ($\gamma_{LC}$) and pitch ($\gamma_{TC}$) directions using a guidance rule, for example the proportional navigation rule.

The computer 11 will transform these acceleration index values into yaw and pitch deflection angle index values for the fins 8 (yaw defection angle index value: $\delta_{LC}$; pitch deflection angle index value: $\delta_{TC}$).

The piloting rule proposed by the invention uses the yaw and pitch acceleration measurements made in continuum by the inertial unit 10. It also uses the measurements made by this same inertial unit of the spin rate of the projectile 1 with respect to the yaw axis (rate expressed as r); with respect to the pitch axis (rate expressed as q) as well as the measurement of the projectile's rate of roll (velocity about the axis Gx).

In accordance with the invention, both the rate of roll an the data related to the other channel are to be introduced into the piloting of each channel.

Such an arrangement allows the yaw (respectively pitch) fin servomechanism to be taken into account as well as the variation of the pitch (respectively yaw) angle. The potential couplings induced by the projectile spin are thus taken into account.

The yaw deflection angle index value to be controlled is thus expressed in the form of the sum:

$$\delta_{LC}=H\ S(\gamma_L)+(K_C\ \gamma_{LC}-K\ \gamma_L)-(\mu r+\upsilon_p pq)$$

With $S(\gamma_L)$ which is the solution of the integral equation:

$$dS(\gamma_L)/dt=\gamma_{LC}-\gamma_L+p\ S(\gamma_T)$$

The expression of $\delta_{LC}$ is once again composed of:

a static term ($K_C\ \gamma_{LC}-K\ \gamma_L$) that depends on the deviation between the index acceleration value and the acceleration value actually measured. This static term is identical to that of the rule previously described.

a dynamic term $-(\mu r+\upsilon_p pq)$ in which, in addition to the rate of yaw r, the rate of roll p and the rate of pitch q are introduced. $\upsilon_p$ is a dynamic gain which, like $\mu$ depends on the projectile's geometry and its flight conditions.

an integral term $H\ S(\gamma_L)=H\int\{\gamma_{LC}-\gamma_L+p\ S(\gamma_{TC})\}\ dt$ that allows the accuracy of the order to be improved. H is the integral gain of the servomechanism.

The invention introduces the rate of roll p and the integral of the integral term related to the pitch into the integral term related to the yaw. The deflection accuracy will thus take into account the yaw/pitch couplings induced by the roll.

All the coefficients ($K_C$, K; $\mu$, H) depend on the projectile's geometry and its flight conditions.

The pitch deflection angle to be controlled is expressed in an analogous form according to the sum:

$$\delta_{TC}=H\ S(\gamma_T)+(K_C\ \gamma_{TC}-K\ \gamma_T)+(\mu q-\upsilon_p pr)$$

With $S(\gamma_T)$ which is the solution of the integral equation:

$$dS(\gamma_T)/dt=\gamma_{TC}-\gamma_T-p\ S(\gamma_L)$$

We note as $\upsilon$ the product $\upsilon_p p$ ($\upsilon=\upsilon_p p$).

The block diagram in FIG. 3 shows the practical formulation of the deflection index values $\delta_{LC}$ and $\gamma_{TC}$ from the acceleration index values ($\gamma_L$ and $\gamma_T$) and the rate of yaw r, rate of pitch q and rate of roll p measurements.

The two yaw and pitch computation channels are no longer independent of one another.

The computation uses an integrator module II for each channel, four amplifier modules A1, A2, A3 and A4 for each channel, an additional amplifier module A5 common to both channels is associated with the gain in roll $\upsilon_p$. These modules are adjusted to the different gains required ($K_C$, K, $\mu$, H, $\upsilon_p$).

The computation uses two multiplier modules M1 and M2 for each channel. These modules allow the yaw/pitch couplings to be taken into account. Both of them have two inputs, one of which being intended for the rate of roll p and the other for the magnitude to be multiplied.

Lastly, the computation implements six adder modules S1, S2, S3, S4, S5 and S6 for each channel.

The modules shown here in the form of "function blocks" for the sake of the clarity of this document are naturally in practice carried out in the form of programming instructions memorized and performed by a microprocessor included in the computer 11.

In a second step of the embodiment according to the invention, the power voltages controlling the back-geared motors that drive the piloting fins in yaw and pitch are established from the deflection angles.

The most commonly used back-geared motors incorporate torque motors supplied with direct current. By modifying the voltage level to control the back-geared motor, it is possible for the fin deflection angle to be modified.

Figure 4:
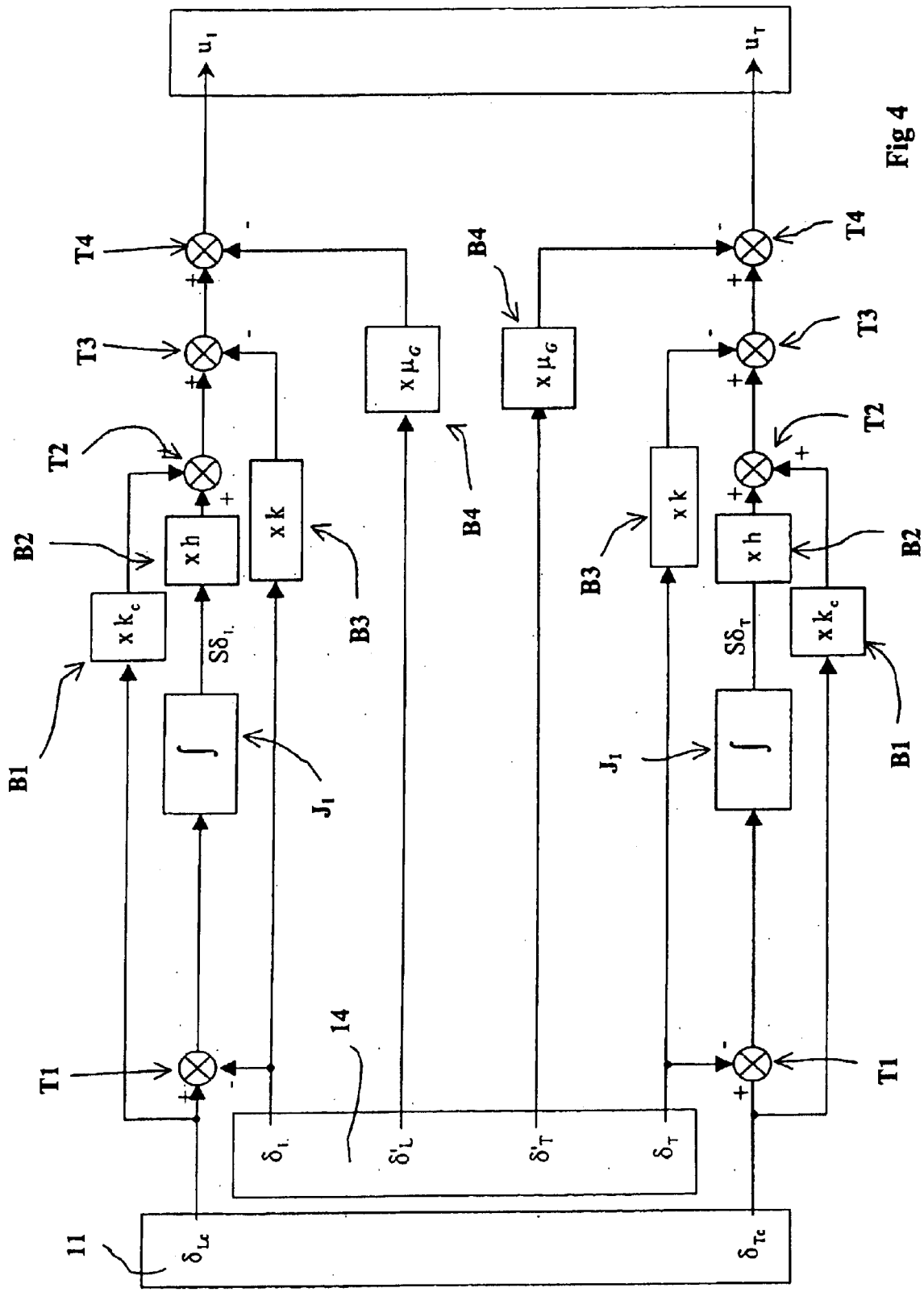
FIG. 4 is a block diagram schematizing the functioning of a process to formulate the control voltages of the back-geared motors for the fins according to prior art.

A classical control rule for such a motor is schematized in FIG. 4.

The electronic computer 11 establishes the desired deflection angle index values $\delta_{LC}$ and $\delta_{TC}$ for the yaw ($\delta_{LC}$) fins. This is established from a classical piloting process described in the first step (FIG. 2).

It is possible, although of little practical interest, to associate the first step of the process according to the invention (FIG. 3) to the fin control rule according to FIG. 4. This combination does not enable the back-geared motors to be made lighter.

These deflection index values must be transformed in the computer 11 into index values for the voltage required to control the back-geared motors (yaw fin motor control voltage: $\mu L$; pitch fin motor control voltage: $u_T$).

The classical control rule described here uses the deflection angle measurements actually obtained further to the order. The actual yaw ($\delta_L$) and pitch ($\delta_T$) deflection angles will be noted. The control rule also uses a measurement of the fin deflection rates for yaw and pitch. These rates are noted $\delta'_L$ for the yaw deflection rate and $\delta'_T$ for the pitch deflection rate. Block 14 schematizes the measurement means. The measurements of the deflection angles are carried out in continuum using Hall effect sensors, for example. The measurements of the deflection rates are carried out by a measurement of the back-electromotive force exerted by the back-geared motor. The Hall effect sensors are usually directly integrated into commercially available back-geared motors so as to allow them to be servo controlled.

The measurement block 14 supplied the desired data to the on-board computer 11.

The voltage $\mu_L$ ensuring the yaw deflection control is thus expressed in the form of the sum:

$$\mu_L = H\, S(\delta_L) + (K_C\, \delta_{LC} - K\, \delta_L) - \mu_G \delta'_L$$

With $S(\delta_L)$ which is the solution of the integral equation:

$$dS(\delta_L)/dt = \delta_{LC} - \delta L$$

The expression of $\mu_L$ is composed of:

- a static term $(K_C\, \delta_{LC} - K\, \delta_L)$ that depends on the deviation between the index deflection angle value and the deflection angle value actually measured. The constants $K_C$ and K are constant corrections gains. K is the static gain and $K_C - K$ the lead phase required for the correction.
- a dynamic term $(-\mu_G\, \delta'_{LC})$ that allows the stability of the servo loop to be improved. $\mu_G$ is the dynamic gain that depends on the electrical and mechanical characteristics of the back-geared motor.
- an integral term $H\, S(\delta_L) = H \int (\delta_{LC} - \delta_L)\, dt$ that allows the accuracy of the order to be improved. H is the integral gain of the servomechanism.

All the coefficients $(K_C, K, \mu_G, H)$ depend on the electrical and mechanical characteristics of the back-geared motor.

It is possible for the integral term to be omitted, but to improve the accuracy of the control it is preferable to retain it.

The voltage $\mu_T$ ensuring the pitch deflection control is expressed in an analogous manner in the form of the sum:

$$\mu_T = H\, S(\delta_T) + (K_C\, \delta_{TC} - K\, \delta_T) - \mu_G \delta'_L$$

With $S(\delta_T)$ which is the solution of the integral equation:

$$dS(\delta_T)/dt = \delta_{TC} - \delta_T$$

The block diagram in FIG. 4 shows the formulation, in practice, of the control voltages $u_L$ and $u_C$ from the deflection angle index value ($\delta_{LC}$ and $\delta_{TC}$), the deflection angle measurements ($\delta_L$ and $\delta_T$), and the measurements of the yaw ($\delta'_L$) and pitch ($\delta'_T$) deflection rates.

There are two computation channels that are parallel and totally independent of one another. One channel is for the computation of the pitch control voltage and the other is for the yaw control voltage.

The computation uses an integrator module J1 for each channel, and four amplifier modules B1, B2, B3 and B4 for each channel. These modules are adjusted to the different gains required ($K_C$, K, $\mu_G$, H). Lastly, the computation implements four adder modules T1, T2, T3 and T4 for each channel.

The modules shown here in the form of "function blocks" for the sake of the clarity of this document are naturally in practice carried out in the form of programming instructions memorized and performed by a microprocessor included in the computer 11.

Such a control process, for a spinning projectile, imposes the use of back-geared motors with high natural frequencies that are therefore substantial in size and cost and require a lot of electrical energy.

Figure 5:
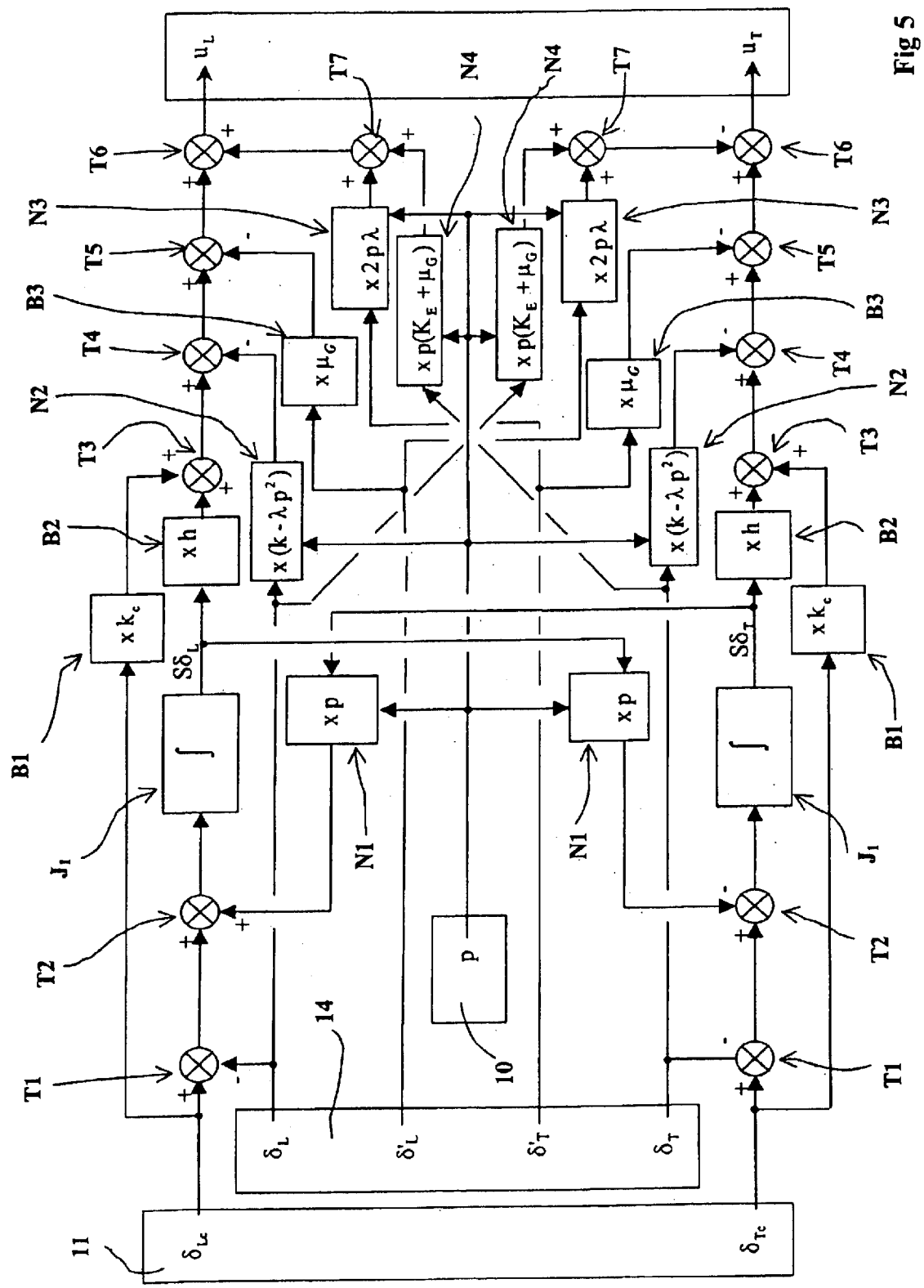
FIG. 5 is a block diagram schematizing the functioning of a process to formulate the control voltages of the back-geared motors for the fins according to the invention.

FIG. 5 shows a block diagram schematizing an embodiment of the voltage control process according to the invention.

Once again, the computer 11 establishes deflection angle index values $\delta_{LC}$ and $\delta_{TC}$ required for the yaw ($\delta_{LC}$) and pitch ($\delta_{TC}$) fins. This will be carried out based on a piloting process that is preferably the one according to the invention and described with reference to FIG. 3.

It is possible, although of little practical interest, to associate the classical piloting process according to FIG. 2 to the fin control rule according to FIG. 5. This combination, however, does not make it possible to overcome the disturbance due to the autorotation of the projectile that slow the projectile down and reduce its range.

These deflection index values must be transformed in the computer 11 into index values for the electrical control voltage of the back-geared motors (yaw fin motor control voltage: $u_L$; pitch fin motor control voltage: $u_T$).

The control rule proposed by the invention, as for the previous ones, uses deflection angle measurements actually obtained in the control sequence. The actual yaw ($\delta_L$) and pitch ($\delta_T$) deflection angles are noted.

The control rule also uses a measurement of the yaw ($\delta'_L$) and pitch ($\delta'_T$) fin deflection rates. Block 14 schematizes the measurement means.

In accordance with the invention, the control rule also uses the measurement, made by the invention unit 10, of the projectile's rate of roll p (velocity about axis Gx).

In accordance with the invention, the rate of roll and the data related to the other channel are introduced into the control of each channel.

Such an arrangement, for the yaw (respectively pitch) fin motor voltage control, enables the spin rate (p) as well as the deflection and the pitch (respectively yaw) fin deflection rates to be taken into account. The phase transitions induced by the projectile spin are thus offset.

The yaw fin deflection control voltage is thus expressed in the form of the sum:

$$u_L = H\, S(\delta_L) + \{K_C \delta_{LC} - (K - \lambda p^2)\delta_L + p(K_E + \mu_G)\delta_T\} - \mu_G \delta'_L + 2\lambda p \delta'_T$$

With $S(\delta_L)$ that is the solution to the integral equation:

$$dS(\delta_L)/dT = \delta_{LC} - \delta_L + p\, S(\delta_T)$$

The expression of $u_L$ once again incorporates:

- a static term $\{K_C \delta_{LC} - (K - \lambda p^2)\delta_L + p(K_E + \mu_G)\delta_T\}$ that depends on the deviation between the deflection angle index value and the deflection angle actually measured. This static term is completed with respect to the previous rule by a corrective term taking into account the rate of roll p and the deflection measured for the other fin (pitch). Coefficient $K_E$ is the constant torque equivalent for each of the back-geared motors (brushless permanent magnet motors), and $\mu_G$ is a constant gain that depends on the mechanical and electrical characteristics of the motor. According to the invention, the static term also incorporates a correction term ($\lambda\, p^2$) for the static gain K, that is proportional to the rate of roll squared ($p^2$) (the numerical value of the term $\lambda\, p^2$ is of around 250 for an autorotation of 10 rps, that is to say greater than the numerical value of K (160) which it is intended to correct).
- a dynamic term $(-\mu_G \delta'_L + 2\lambda p \delta'_T)$ in which, in addition to the yaw deflection rate $\delta'_L$, the rate of roll p and the pitch deflection rate $\delta'_T$ are introduced. $\lambda$ is a dynamic gain that, as for $\mu_G$, will depend on the electrical and mechanical characteristics of the back-geared motor.

an integral term H $S(\delta_L)$=H$\int(\delta_{LC}-\delta_L+p\ S(\delta_T))$ dt which allows the control accuracy to be improved. H is the integral gain of the servomechanism. The invention thus introduces the rate of roll and the integral of the pitch integral term into the yaw integral term. The accuracy of the motor control thus takes the pitch/yaw couplings induced by the roll into account.

All the coefficients (H, $K_C$, K, $\mu_G$, $K_E$ and $\lambda$) depend on the electrical and mechanical characteristics of the motor.

Namely parameter $\lambda=R_E J_E/\rho K_E$, expression in which $R_E$ is the equivalent resistance of each of the power supply circuits, $J_E$ is the moment of inertia of each of the plane fin and motor assemblies reduced on the fin axes, $K_E$ is the equivalent torque constant of each of the motors (brushless, permanent magnet motors), $\rho$ is the mechanical yield of each of the motors.

Similarly, the pitch deflection control voltage is expressed in the form of the sum:

$$u_T=H\ S(\delta_T)+\{K_C\delta_{TC}-(K-\lambda p^2)\delta_T+p(K_E+\mu_G)\delta_L\}-\mu_G\delta'_T+2\lambda p\delta'_L$$

With $S(\delta'_L)$ that is the solution to the integral equation:

$$dS(\delta_T)/dt=\delta_{TC}-\delta_T+p\ S(\delta_L)$$

The block diagram is FIG. 5 shows the formulation in practice of the control voltages $\mu_L$ and $\mu_T$ from the deflection angle index values ($\delta_{LC}$ and $\delta_{TC}$), the deflection angle measurements ($\delta_L$ and $\delta_T$), the yaw ($\delta'_L$) and pitch ($\delta'_T$) deflection rates and the rate of roll p of the projectile.

The two yaw and pitch computation channels are no longer independent of one another.

The computation uses an integrator module J1 for each channel, three amplifier modules B1, B2 and B3 for each channel. These modules are adjusted to the different gains desired ($K_C$, H, $\mu_G$). The computation implements three multipliers N1, N2 and N3. Each of these has two inputs, one of which is for the rate of roll p and the other for the magnitude to be multiplied. An adjustable gain coefficient is associated with certain multipliers: ($K_E+\mu_G$) for N2, $2\lambda$ for N3.

The multipliers N2 carries out the correction in static gain, it ensures the squaring of the rate of roll p then the computation of $K-\lambda p^2$ before making the product of this expression with the measured deflection angle in question.

Lastly, the computer incorporates seven adder modules T1, T2, T3, T4, T5, T6 and T7 for each channel.

The modules shown here in the form of "function blocks" for the sake of the clarity of this document are naturally in practice carried out in the form of programming instructions memorized and performed by a microprocessor included in the computer 11.

The fin voltage control rule has been simulated for a back-geared motor having the following technical characteristics:

| | |
|---|---|
| Equivalent resistance $R_E$ | 8.14 Ω |
| Equivalent torque constant $K_E$ | 0.6912 N.m/A |
| Equivalent inertia $J_E$ | 0.004 kg m² |
| Reduction gear yield $\rho$ | 0.75 |
| Maximal intensity at 15 volts Imax | 1.84 A |
| Maximal torque at the fins at 15 volts Cmax | 0.96 N.m |

| Coefficient | Value |
|---|---|
| H | 1233.51 V/s/rd |
| $\mu_G$ | 3.853 V.s/rd |
| K | 161.162 V/rd |
| $K_C$ | 121.499 V/rd |

This gives an attenuation time of less than 0.1 s. Such a value is excellent and ensures the correct positioning of the fin in the required position without oscillation.

Figure 6:
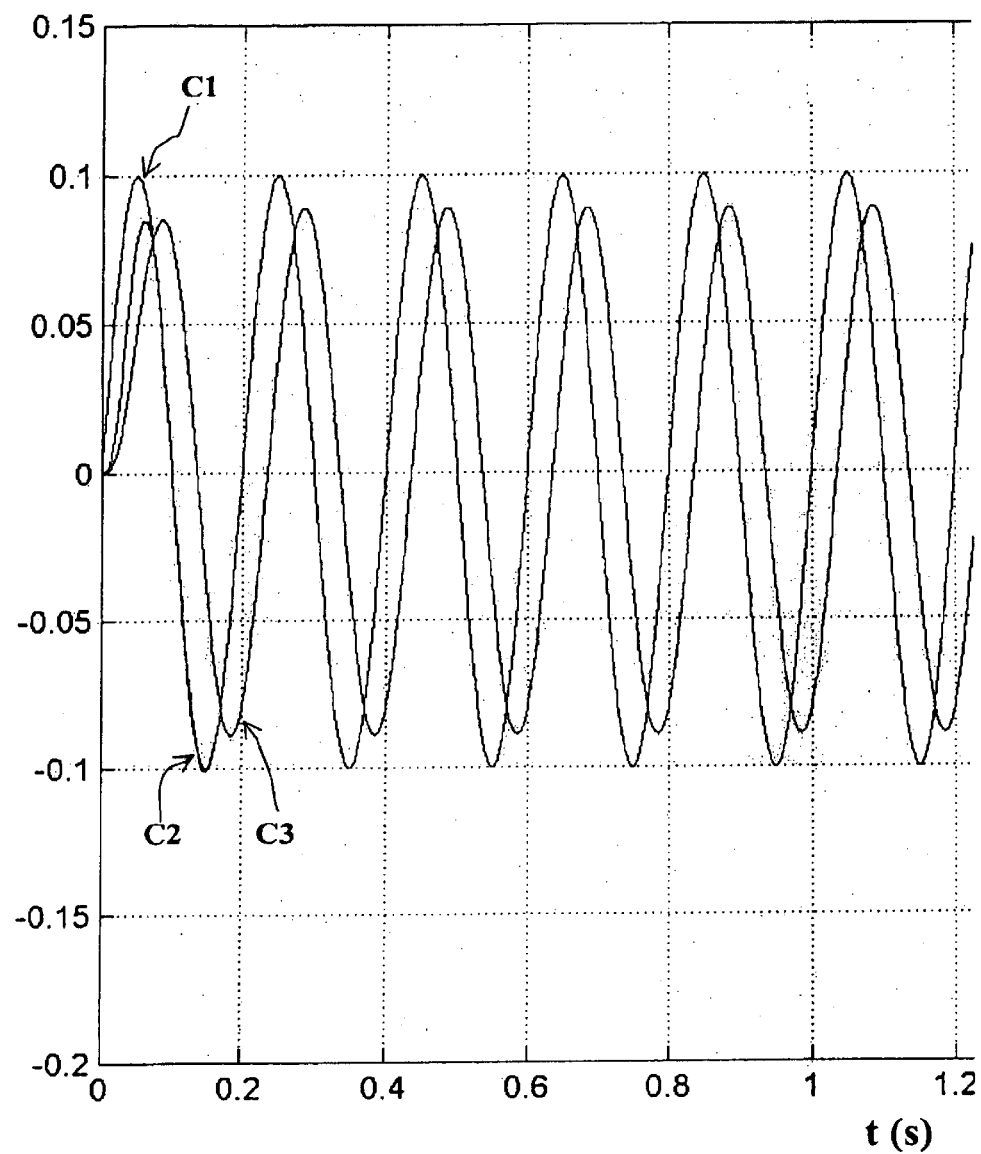
FIGS. 6 and 7 are graphs comparing, for two spin rates of the projectile, the deflection responses obtained using the process according to the invention and those obtained using known processes.
Figure 7:
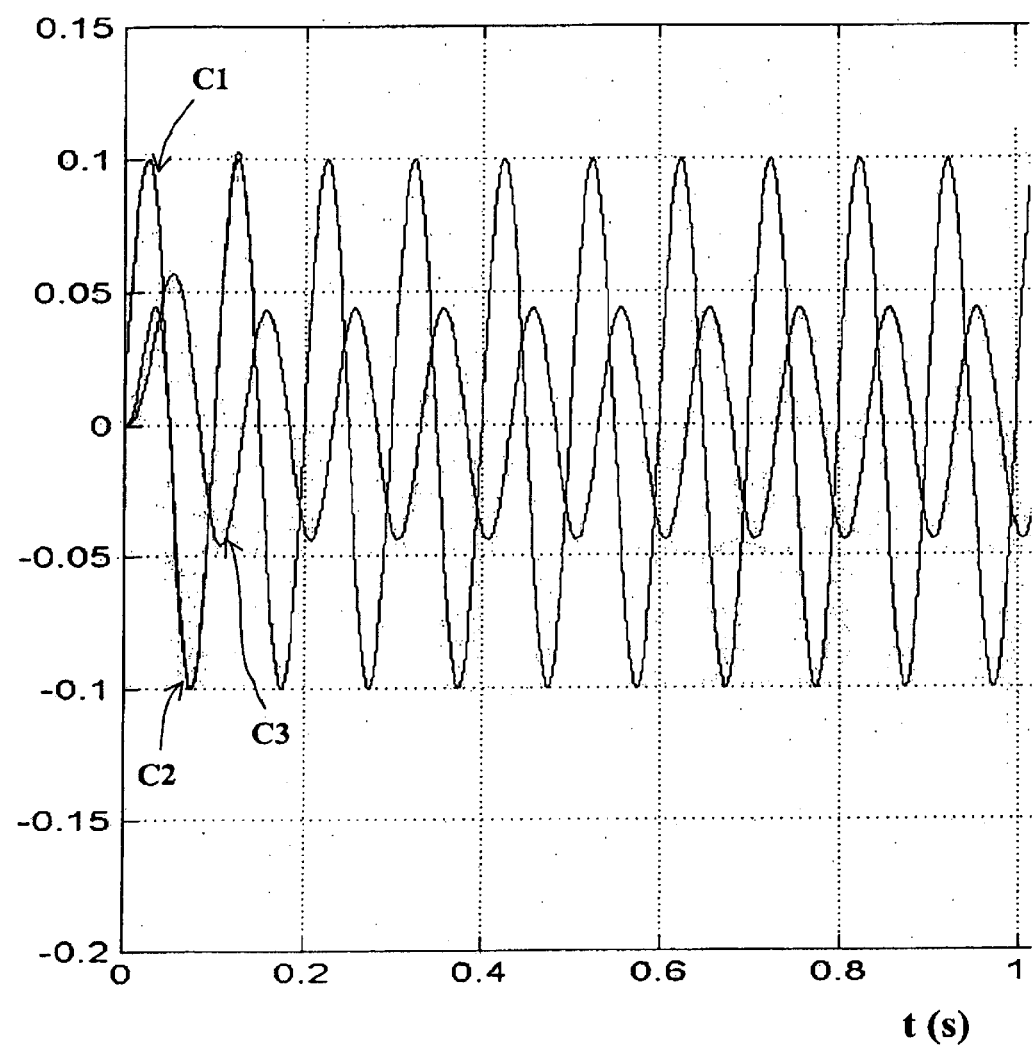

FIGS. 6 and 7 thus show the deflection responses in reaction to a deflection index value of 0.1 rd modulated by the roll of the projectile for two rates of roll of the projectile (FIG. 6: p=5 rps, FIG. 7: p=10 rps).

On each Figure, curve C1 represents the index value; curve C2 represents the response obtained with the voltage control process according to the invention (as schematized in FIG. 5) and curve C3 represents the response obtained with the voltage control according to prior art (process according to FIG. 4).

For both rates an excellent reproduction of the index value can be observed when the control rule according to the invention is used (the duration of the transitory phase is less than 0.1 s). However, the use of a classical control rule with the motors defined here before leads, especially at high rates of roll, to errors of magnitude and above all to phase transitions (greater than 90° in absolute value for autorotation at least equal to 7 rps) that are incompatible with projectile stability.

These phase transitions are converted into parasitic deflections that destabilize the projectile by transmitting to it very badly damped pendulous movements, and thus in the best case, which slow the projectile down and substantially reduce its range. At higher rates of autorotation, the conventional fin control rule becomes rapidly inoperative thereby leading to the failure of the mission.

For a gliding projectile of 141 mm caliber in flight (fired from a 155 mm barrel) piloted by two canard planes (four fins controlled two by two), the projectile having a natural frequency of pendulous motion of around 1 Hz, an autorotation rate of around 5 Hz and subjected to a random wind velocity at nil normal and mean distribution in a given direction (numerical wind velocity values given by standard US MIL STD 201 B).

A projectile is equipped with an inertial unit having roll, yaw and pitch pyrometers whose errors are independent, normal and characterized by the following standard deviations:

Skew (error at nil spin rate): 0.03°/s

Proportionality: 0.1 $10^{-3}$

The inertial unit is also equipped with accelerometers whose normal and independent errors are characterized by the following standard deviations:

Skew (error at nil spin rate): 0.1 m/s²

Proportionality: 2 $10^{-3}$

With such data the coefficients of the classical piloting rules and those according to the invention are given in the following table:

| Coefficient | Value |
|---|---|
| H | 0.00985 s/m |
| $\mu$ | 0.094 s |
| K | 0.002 s$^2$/m |
| $K_C$ | 0.000585 s$^2$/m |
| $v_p$ | 0.001 |

A simulation of piloted behavior has been carried out using a classical piloting process such as that described with reference to FIGS. 2 and 4, then using the process produced by the invention and described with reference to FIGS. 3 and 5.

We studied:
- the maximal target range (Pmax) with decametric accuracy at nil wind velocity,
- the accuracy obtained at 55 km by shots effectively reaching the vicinity of the target (equiprobable radius),
- firing reliability at 55 km, that is the numerical proportion of shots effectively reaching the vicinity of the target.

The results obtained by numerical simulation using the Monte Carlo method are collated into the following table:

|  | Maximal range Pmax | Accuracy at 55 km | Firing reliability at 55 km |
|---|---|---|---|
| Classical piloting process | 58 km | ≈15 m | ≈66% |
| Piloting process according to the invention | 65 km | <10 m | >99% |

We observe that the piloting process according to the invention procures a considerable improvement in firing reliability as well as an increase in accuracy and range.

While the invention has been described in conjunction with exemplary embodiments outlined above, many alternatives, modifications and variations will be apparent to those skilled in the art. Accordingly, the exemplary embodiments of the invention, as set forth above, are intended to be illustrative, not limiting. Various changes can be made without departing from the spirit and scope of the invention.

What is claimed is:

1. A method for controlling a spinning projectile that revolves about a first axis of three orthogonal axes at a roll angular velocity, the method providing a control order that modifies a parameter of one of second and third orthogonal axes of the projectile, the parameter being controlled for the one orthogonal axis, process in which the control order is evaluated as the sum of a static term, the method comprising:

measuring position intensities to obtain a measured acceleration parameter for the one orthogonal axis;

determining a required acceleration term to obtain an acceleration index value for the one orthogonal axis;

determining a static gain to the measured acceleration term and a phase lead gain to the acceleration index value;

multiplying the static gain by the measured acceleration parameter to yield a correction term;

multiplying the phase lead gain by the acceleration index value to yield a phase lead term;

subtracting the correction term from the phase lead term to yield a static term;

determining an angular spin rate about the one orthogonal axis;

multiplying a minus dynamic gain by the angular spin rate to yield a dynamic term for the one orthogonal axis;

determining a drift through time of a deviation parameter between the acceleration index value and the measured acceleration term for the one orthogonal axis;

integrating deviation parameters through time to yield an integral solution for the one orthogonal axis;

multiplying an integral gain by the integral solution to yield an integral term for the one orthogonal axis;

summing the integral term, the static term and the dynamic term to yield an angular deflection parameter for the one orthogonal axis as a piloting parameter for the one orthogonal axis;

evaluating at least one corrective coupling term based on the other of the second and third orthogonal axes and including in the piloting parameter of the one orthogonal axis;

modifying the piloting parameter of the one orthogonal axis to be proportional to the roll angular velocity and also proportional to a drift through time of the piloting parameter for the other orthogonal axis.

2. The method for providing the control order according to claim 1, wherein, at least an integral corrective coupling term is included into the integral term for the one orthogonal axis that is proportional to the roll angular velocity and to the piloting parameter for the other orthogonal axis, when the control order comprises an integral term proportional to an integral as a function of the time of the deviations between the position intensities measured and indexed of the parameter for the one orthogonal axis to be controlled.

3. The method for providing the control order according to claim 2, wherein the control order is a deflection angle index value ($\delta_{LC}$, $\delta_{TC}$) for piloting fin for the one of the second and third orthogonal axes, modifying the deflection angle index value causing a corresponding modification of a piloting parameter wherein the piloting parameter is the angular acceleration ($\gamma_L$, $\gamma_T$) of the projectile according to the one orthogonal axis at a reference linked to the projectile deviations over time of said accelerations being the projectile's spin rate (r, q) about the second and third orthogonal axes that correspond to a yaw and pitch, respectively, the deflection angle index values are thus expressed as follow:

yaw deflection angle index value:

$$\delta_{LC} = H\, S(\gamma_L) + K_C \gamma_{LC} - K\, \gamma_L - (\mu r + v_p p q)$$

pitch deflection angle index value $$\delta_{TC} = H\, S(\gamma_T) + K_C \gamma_{TC} - K\, \gamma_T - (\mu q + v_p p r)$$

variables $S(\gamma_L)$ and $S(\gamma_T)$ of the integral terms being obtained via an integration of functions:

$$dS(\gamma_L)/dt = \gamma_{LC} - \gamma_L + p\, S(\gamma_T)$$

$$dS(\gamma_T)/dt = \gamma_{TC} - \gamma_T + p\, S(\gamma_L)$$

expressions in which: H, $K_C$, K, $\mu$ and $v_p$ are constants that depend on a geometry of the projectile and its flight conditions, $\gamma_{LC}$ and $\gamma_{TC}$ being acceleration index values to be transmitted to the projectile according to the one and the other orthogonal axes, index values being supplied by a guidance rule.

4. The method for providing the control order according to claim 2, wherein the control order is an electrical control voltage ($u_L$, $u_T$) for a back-geared motor driving a piloting fin for the one orthogonal axis of the second and third orthogonal axes that correspond to yaw and pitch, respectively, modification of the control voltage causing a corresponding modification of the piloting parameter that is a deflection angle ($\delta_L$, $\delta_T$) of the piloting fin for the one orthogonal axis, drift through time of said deflection angle ($\delta'_L$, $\delta'_T$) being integrated through time, a static corrective coupling term is proportional to the roll angular velocity and also proportional to a deflection angle for the other orthogonal axis is included into the electrical control voltage for a piloting fin for the one orthogonal axis, and a corrective coefficient of the static gain-proportional to the roll angular velocity squared and to the deflection angle of the one orthogonal axis is included into the static term, the control voltages are expressed as follows:

control voltage of a yaw piloting fin:

$$u_L = H\, S(\delta_L) + K_C \delta_{LC} - (K - \lambda p^2)\delta_L + p(K_E + \mu_G)\delta_T - \mu_G \delta'_L + 2\lambda p \delta'_T$$

control voltage of a pitch piloting fin:

$$u_T = H\, S(\delta_T) + K_C \delta_{TC} - (K - \lambda p^2)\delta_T + p(K_E + \mu_G)\delta_L - \mu_G \delta'_T + 2\lambda p \delta'_L$$

the variables $S(\delta_L)$ and $S(\delta_T)$ of the integral terms being obtained by integrating following functions:

$$dS(\delta_L)/dt = \delta_{LC} - \delta_L + p\, S(\delta_T)$$

$$dS(\delta_T)/dt = \delta_{TC} - \delta_T + p\, S(\delta_L)$$

expressions in which H, $K_C$, K, $\mu_G$, $K_E$ and $\lambda$ are constants that depend on a back-geared motor and inertia of the projectile being controlled, $\delta_{LC}$ and $\delta_{TC}$ being deflection angle index values to be controlled for the one orthogonal axis, the index values being supplied by index value formulation means.

5. The method for providing the control order according to claim 4, wherein the deflection angle index values $\delta_{LC}$, $\delta_{TC}$ are controlled for a piloting fin for the one orthogonal axis, modifying the deflection angle index value causing a corresponding modification of a piloting parameter, wherein the piloting parameter is the angular acceleration ($\gamma_L$, $\gamma_T$) of the projectile according to the one orthogonal axis at a reference linked to the projectile, deviations over time of said accelerations being the projectile's spin rate (r, q) about the second and third orthogonal axes that correspond to yaw and pitch, respectively, the deflection angle index values are thus expressed as follows:

yaw deflection angle index value:

$$\delta_{LC} = H\, S(\gamma_L) + K_C \gamma_{LC} - K \gamma_L - (\mu r + \upsilon_p pq)$$

pitch deflection angle index value $$\delta_{TC} = H\, S(\gamma_T) + K_C \gamma_{TC} - K \gamma_T - (\mu q + \upsilon_p pq)$$

variables $S(\gamma_L)$ and $S(\gamma_T)$ of the integral terms being obtained via an integration of functions:

$$dS(\gamma_L)/dt = \gamma_{LC} - \gamma_L + p\, S(\gamma_T)$$

$$dS(\gamma_T)/dt = \gamma_{TC} - \gamma_T + p\, S(\gamma_L)$$

expressions in which: H, $K_C$, K, $\mu$ and $\upsilon_p$ are constants that depend on a geometry of the projectile and its flight conditions, $\gamma_{LC}$ and $\gamma_{TC}$ being acceleration index values to be transmitted to the projectile according to the one and the other orthogonal axes, the index values being supplied by a guidance roll.

* * * * *